Patented June 17, 1930

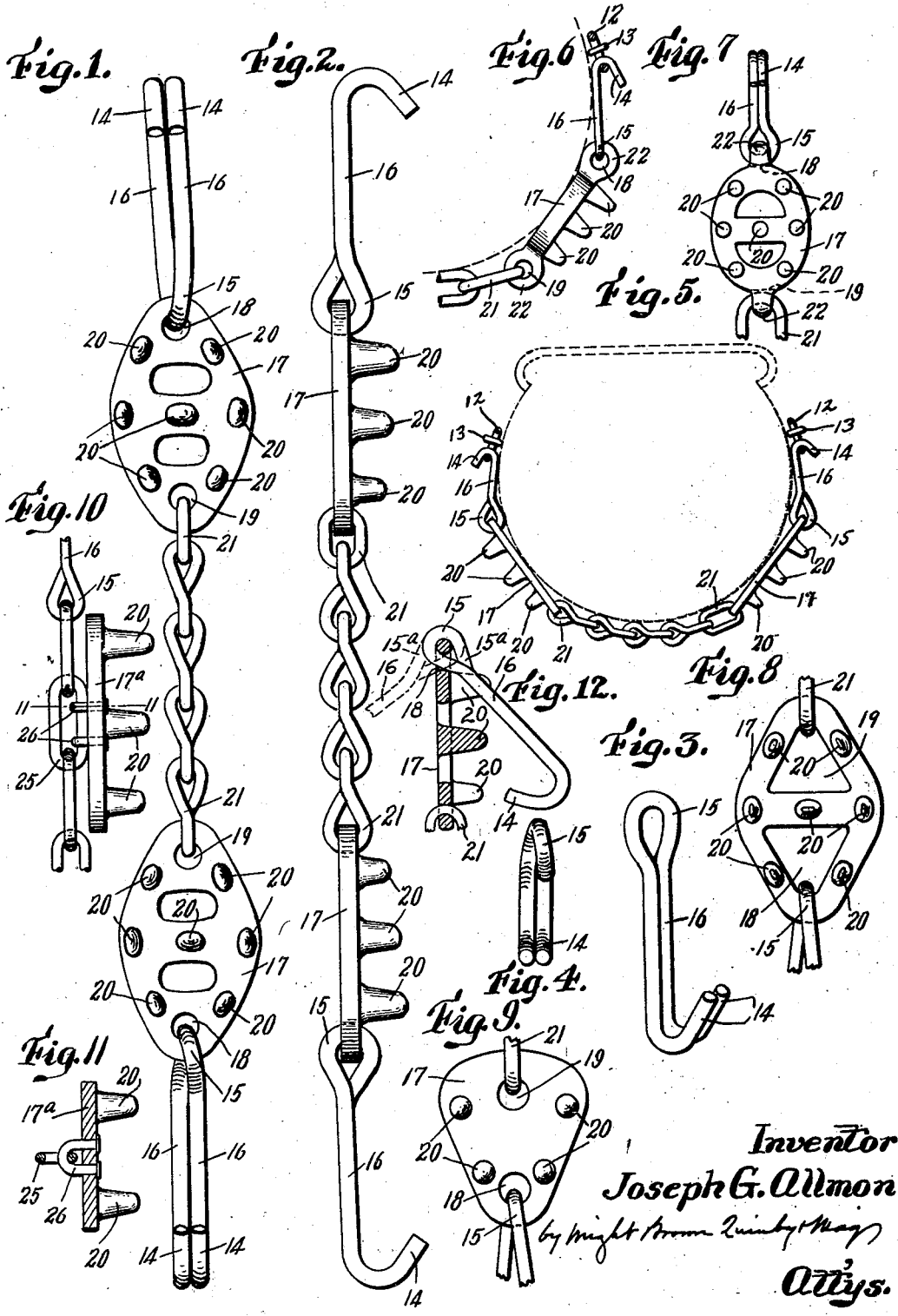

1,763,998

UNITED STATES PATENT OFFICE

JOSEPH G. ALLMON, OF MELROSE, MASSACHUSETTS

ANTISKID CHAIN

Application filed January 2, 1929. Serial No. 329,837.

This invention relates to an anti-skid device of the type disclosed by my Patent No. 1,574,014, dated February 23, 1926, said device comprising two circular side chains adapted to be positioned on either side of a wheel tire, a plurality of cross chains coupled to the side chains and extending across the tire tread, and two spaced apart groups of barbs carried by the cross chains adjacent the side chains and normally out of contact with the ground, said side chains being proportioned to permit limited longitudinal movement of the cross chains transversely of the wheel responsive to a sideways slipping of the wheel, so that the group of barbs adjacent one of the side chains will be drawn by said sideways slipping of the wheel into engagement with the ground.

The present invention is embodied in improvements in the portions of the cross chains carrying the groups of barbs, and in improvements in the end links coupled to the side chains, one object being to provide a barbed cross chain comprising a rigid inflexible barbed member including a rigid base portion and a plurality of spaced apart rows of rigid barbs integral with the rigid base portion and projecting from the outer side thereof, said members being movable by the sideways slipping of the wheel.

Another object is to provide an improved construction of the side chain-engaging end links of the cross chains, whereby said end links are rendered free from liability of being caught by or entangled with the barbs when the device is not in use.

Of the accompanying drawings forming a part of this specification—

Figure 1 is a side view, showing the preferred construction of the barbed members and the end links of my improved cross chain.

Figure 2 is an edge view of the same.

Figure 3 is a perspective view of one of the end links.

Figure 4 is an end view of one of the end links.

Figure 5 shows by dotted lines a cross section through a tire and rim, and by full lines portions of the two side chains in section, and an edge view of one of the cross chains engaged with the side chains.

Figure 6 is a view similar to a portion of Figure 5, showing end portions of one of the cross chains, and a barbed member differing in form from the members shown by the preceding figures.

Figure 7 is a side view of the cross chain portion shown by Figure 6.

Figures 8 and 9 are fragmentary side views, showing modified forms of the barbed member.

Figure 10 is a view similar to a portion of Figure 2, showing a modification.

Figure 11 is a section on line 11—11 of Figure 10.

Figure 12 is a partly sectional view similar to a portion of Figure 2, showing different positions of the end link.

The same reference characters indicate the same parts in all of the figures.

The side chains shown in transverse section by Figure 5 may be of any suitable construction and include interconnected links 12 and 13, the side chains extending around the sides of the tire 2 and being movable thereon as and for the purpose described by my former patent.

Each of my improved cross chains comprises two end links adapted to be coupled to the side chains, said links having side chain-engaging hooks 14 at their outer ends. Each end link is preferably composed of a single length of wire, bent at its midlength portion to form a loop 15, and at its end portions to form a hook 14, intermediate portions of the wire constituting a shank 16, composed of two parts extending outward from the loop 15 and held side by side thereby.

The cross chain comprises also two rigid spaced apart barbed members, each including a rigid base portion 17 having a substantially flat inner side arranged to face the tire tread, and a substantially flat outer side arranged to face the tire track, and a plurality of rows of rigid barbs 20, integral with the base portion 17 and projecting from the outer side thereof to engage the track, said rows extending crosswise of the chain. Said members are preferably links of the cross chain, the base portion 17 of each member having an outer eye 18, and an inner eye 19, for engagement with the other links of the chain. The holder and barbs are made in one piece, preferably by a casting operation.

The end links and the links formed by the barbed members constitute the end portions of the cross chain, the barbed members being connected with each other by a short length of flexible chain, the end links 21 of which are engaged with the inner eyes 19 of the bases 17. The eyes 18 and 19 may be the margins of orifices extending through the base 17 from side to side thereof, as shown by Figures 1, 8 and 9. Said orifices may be relatively small, as shown by Figures 1 and 9, or larger, as shown by Figure 8.

The eye-forming orifices shown by Figures 6 and 7, extend crosswise of the base 17, and are formed in projections 22, integral with the base and projecting from opposite ends thereof. The base 17 shown by Figures 6 and 7, may be considerably thicker than that shown by the other figures, to adapt the base and its barbs for use with tires of a truck, or other relatively heavy vehicle.

In all cases the base 17 has sufficient thickness to render it rigid, and enable it to rigidly support the barbs and withstand the pressure and rough usage to which the device is subjected. The barbs formed by a casting operation, may be suitably massive to enable them to operate successfully and withstand rough usage. Because of the fact that all of the barbs are integral with, and rigidly supported by the rigid base 17, there is no liability of independent displacement of any barb or barbs of the group relative to the others of the same group, the barbs being sufficiently sturdy to withstand any bending pressure to which they may be subjected.

The form of the base 17, and the number and arrangement of the barbs thereon, may be variously modified. There may be three transverse rows of barbs, as shown by Figures 1, 7 and 8, the rows being at different distances from the outer end of the base. Figure 9 shows two transverse rows, and shows one end of the base wider than the other.

As described by my former patent, and as shown by Figures 2, 5 and 6, the barbs are of stepped lengths, the outer barbs having the greatest length.

The loop 15 of each end link is formed as shown by Figure 2, the loop having oppositely inclined portions 15$^a$, adapted to abut a side of the eye 18, when the end link is swinging to either of the positions shown by full and dotted lines in Figure 12, so that the end link has a limited swinging movement, the arrangement being such that the end links cannot swing to positions causing their entanglement with the barbs when the device is not in use and is stored in a receptacle on a vehicle.

The operation of the device, when applied to a tire, is fully described by my former patent, the arrangement being such as if the tire commences to slip laterally, the cross chains will be shifted longitudinally and crosswise of the tire, so that the barbs at the inner end of one of the bases 17 will engage the ground first, after which the barbs nearer the outer end of the said base will successively engage the ground and oppose further side movement of the tire.

Each barbed member may be formed separately from the cross chain and attached thereto, as indicated by Figures 10 and 11. The base shown by these figures is designated by 17$^a$, and is provided with means whereby it may be attached to a link 25 of a cross chain which includes two of the described end links adapted to be coupled to the side chains.

Any suitable means may be provided for attaching the base 17$^a$ to a cross-chain link. In this instance, I show as the attaching means two staple-shaped rivets 26, embracing a side portion of a cross-chain link 25, and engaged with the base 17$^a$, as shown by Figure 11.

I claim:

In an antiskid chain which includes a pair of side chains and a plurality of cross chains engaged with and extending between the side chains, and adapted to extend across a tire tread, a pair of spaced apart members provided with anti-slipping barbs of stepped lengths, arranged in rows which are spaced apart and extend crosswise of the cross chains, each of said spaced apart members comprising a rigid oblong base portion elongated in the direction of the length of the cross chain and having an inner side arranged to face the tire tread, and an outer side arranged to face the tire track, the barbs of each member being rigid and each integral with the base portion thereof.

In testimony whereof I have affixed my signature.

JOSEPH G. ALLMON.